United States Patent
Cao

(10) Patent No.: US 9,282,043 B1
(45) Date of Patent: Mar. 8, 2016

(54) TREND-BASED FLOW AGGREGATION FOR FLOW SUPPRESSION

(71) Applicant: Juniper Networks, Inc., Sunnyvale, CA (US)

(72) Inventor: Qi-Zhong Cao, Southborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 264 days.

(21) Appl. No.: 14/035,599

(22) Filed: Sep. 24, 2013

(51) Int. Cl.
*H04L 12/801* (2013.01)

(52) U.S. Cl.
CPC ........................... *H04L 47/12* (2013.01)

(58) Field of Classification Search
CPC ....... H04L 47/10; H04L 47/32; H04L 45/302; H04L 49/90; H04L 45/125; H04L 47/11; H04W 36/22; H04W 24/02; H04W 28/0247; H04W 28/08; H04W 24/10; H04W 28/02
See application file for complete search history.

(56) References Cited

U.S. PATENT DOCUMENTS

| 6,499,107 B1 | 12/2002 | Gleichauf et al. |
| 7,391,760 B1* | 6/2008 | Caldwell ................. H04L 12/66 370/352 |
| 8,397,284 B2 | 3/2013 | Kommareddy et al. |
| 2004/0093513 A1 | 5/2004 | Cantrell et al. |
| 2013/0254324 A1* | 9/2013 | Kramnik ............. G06F 12/0246 709/213 |

* cited by examiner

Primary Examiner — Fan Ng
(74) Attorney, Agent, or Firm — Harrity, LLP

(57) ABSTRACT

A device may determine a first aggregation level for aggregating incoming packets. The device may aggregate the incoming packets using the first aggregation level. The device may determine that a controlled packet pass rate for the incoming packets satisfies an arrival rate threshold based on aggregating the incoming packets using the first aggregation level. The device may determine a bandwidth violation trend associated with the incoming packets and the first aggregation level based on determining that the controlled packet pass rate satisfies the threshold. The device may determine that flow suppression is not effective at the first aggregation level based on the bandwidth violation trend, and may determine a second aggregation level based on determining that the flow suppression is not effective. The device may set the first aggregation level to the second aggregation level. The device may use the first aggregation level for aggregating additional incoming packets.

20 Claims, 10 Drawing Sheets

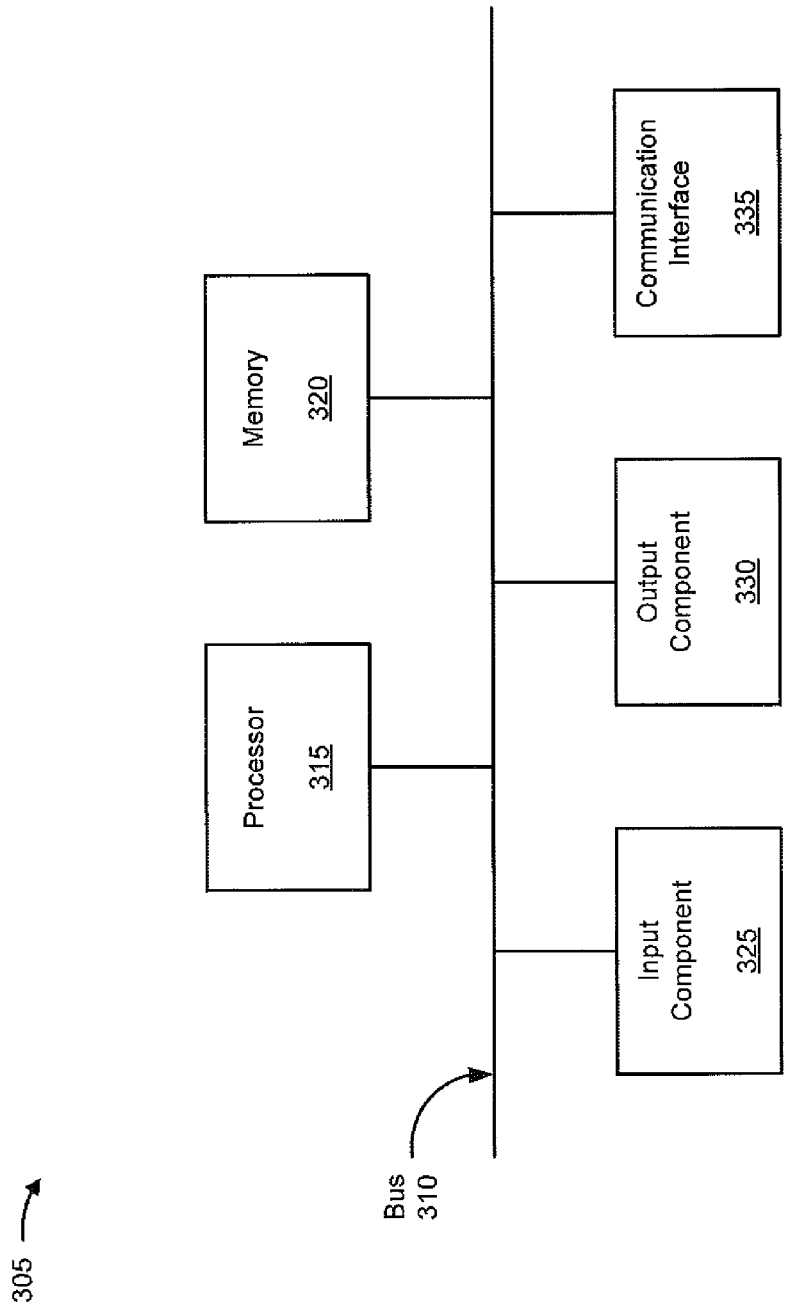

| Level 510 | Operation Mode 520 | Search-Map 530 |
|---|---|---|
| Subscriber | Automatic (A) | Search (F) |
| Logical | Off (X) | Off (X) |
| Physical | Automatic (A) | Off (X) |

TREND-BASED FLOW AGGREGATION FOR FLOW SUPPRESSION

BACKGROUND

Packet policers may limit network traffic arriving at a router, to protect the router and the network, by dropping packets. The packets dropped by a packet policer may include malicious attack traffic as well as critical network signaling packets and/or system control packets. Dropping malicious packets while preserving non-malicious packets may be critical to the operation of devices and the network. Identification of unwanted individual suspicious packets may consume an unreasonable quantity of system resources.

SUMMARY

According to some possible implementations, a device may include one or more processors configured to: determine a first aggregation level for aggregating incoming packets; aggregate the incoming packets using the first aggregation level; determine a controlled packet pass rate for the incoming packets; determine that the controlled packet pass rate satisfies an arrival rate threshold based on aggregating the incoming packets using the first aggregation level; determine a bandwidth violation trend associated with the incoming packets and the first aggregation level based on determining that the controlled packet pass rate satisfies the arrival rate threshold, where the bandwidth violation trend indicates a quantity of bandwidth violation observation periods during which the controlled packet pass rate satisfied the arrival rate threshold; determine that flow suppression is not effective at the first aggregation level based on the bandwidth violation trend; determine a second aggregation level based on determining that flow suppression is not effective at the first aggregation level, where the second aggregation level is different from the first aggregation level; set the first aggregation level to the second aggregation level; and use the first aggregation level for aggregating additional incoming packets based on setting the first aggregation level to the second aggregation level.

According to some possible implementations, a computer-readable medium may store one or more instructions that, when executed by one or more processors, cause the one or more processors to: determine a first aggregation level for aggregating incoming packets, where the incoming packets are associated with a packet type; determine a controlled packet pass rate, associated with the first aggregation level, for the incoming packets associated with the packet type; determine that the controlled packet pass rate satisfies an arrival rate threshold; determine a flow-dropping trend associated with the packet type and the first aggregation level, where the flow-dropping trend indicates a quantity of flow-dropping observation periods during which a flow-drop rate at which incoming packets are dropped satisfies a rate of change threshold; determine that flow suppression is not effective based on the flow-dropping trend; determine a second aggregation level based on determining that flow suppression is not effective, where the second aggregation level is different from the first aggregation level; and aggregate incoming packets for flow suppression based on the second aggregation level.

According to some possible implementations, a method may include: determining, by a device, a first aggregation level for aggregating incoming packets; determining, by the device, a controlled packet pass rate for the incoming packets based on the first aggregation level; determining, by the device, a bandwidth violation trend associated with the incoming packets based on the controlled packet pass rate; determining, by the device, a flow-drop rate at which the incoming packets are dropped; determining, by the device, a flow-dropping trend based on the flow-drop rate; determining, by the device, that flow suppression is not effective at the first aggregation level based on the bandwidth violation trend or the flow-dropping trend; determining, by the device, a second aggregation level based on determining that flow suppression is not effective, where the second aggregation level is different from the first aggregation level; and aggregating, by the device, incoming packets for flow suppression based on the second aggregation level.

BRIEF DESCRIPTION OF THE DRAWINGS

FIGS. 3A and 3B are diagrams of example components of one or more devices of FIG. 2;

DETAILED DESCRIPTION

The following detailed description of example implementations refers to the accompanying drawings. The same reference numbers in different drawings may identify the same or similar elements.

Network signaling and system control packets may be used to launch a distributed denial of service (DDoS) attack, posing a serious risk to network operation. DDoS attacks may be distributed across multiple sources, such as sources associated with particular network addresses, network ports, network protocols, or the like. The traffic flows from the multiple sources may arrive at rates below a threshold detectability level. DDoS attacks may be mitigated by policing control traffic based on packet type. However, policing may drop important network signaling packets and system control packets along with unwanted packets (e.g., suspicious packets from a suspicious flow). Individual traffic flows may be targeted, and suspicious packets may be identified, tracked, and controlled based on identification of a traffic profile, a network address, and/or a network port associated with the suspicious flows. However, targeting individual traffic flows may involve excessive utilization of system resources, and may require manual configuration to adjust to changing network conditions. Implementations described herein may assist a network device in configuring flow suppression using trend-based flow aggregation level adjustment.

A "packet," as used herein, may refer to a packet, a datagram, a cell, a frame, a fragment of a packet, a fragment of a datagram, a fragment of a cell, a fragment of a frame, or any other type or arrangement of data that may be carried at a specified communication layer.

A traffic flow (e.g., a flow) may include a sequence of packets that are grouped based on one or more identifiers, such as a source network address identifier, a destination network address identifier, a source port identifier, a destination port identifier, a protocol identifier (e.g., a transport layer protocol identifier, such as a transmission control protocol (TCP) identifier, a user datagram protocol (UDP) identifier, an internet control message protocol (ICMP) identifier, etc.), or the like.

Figure 1:
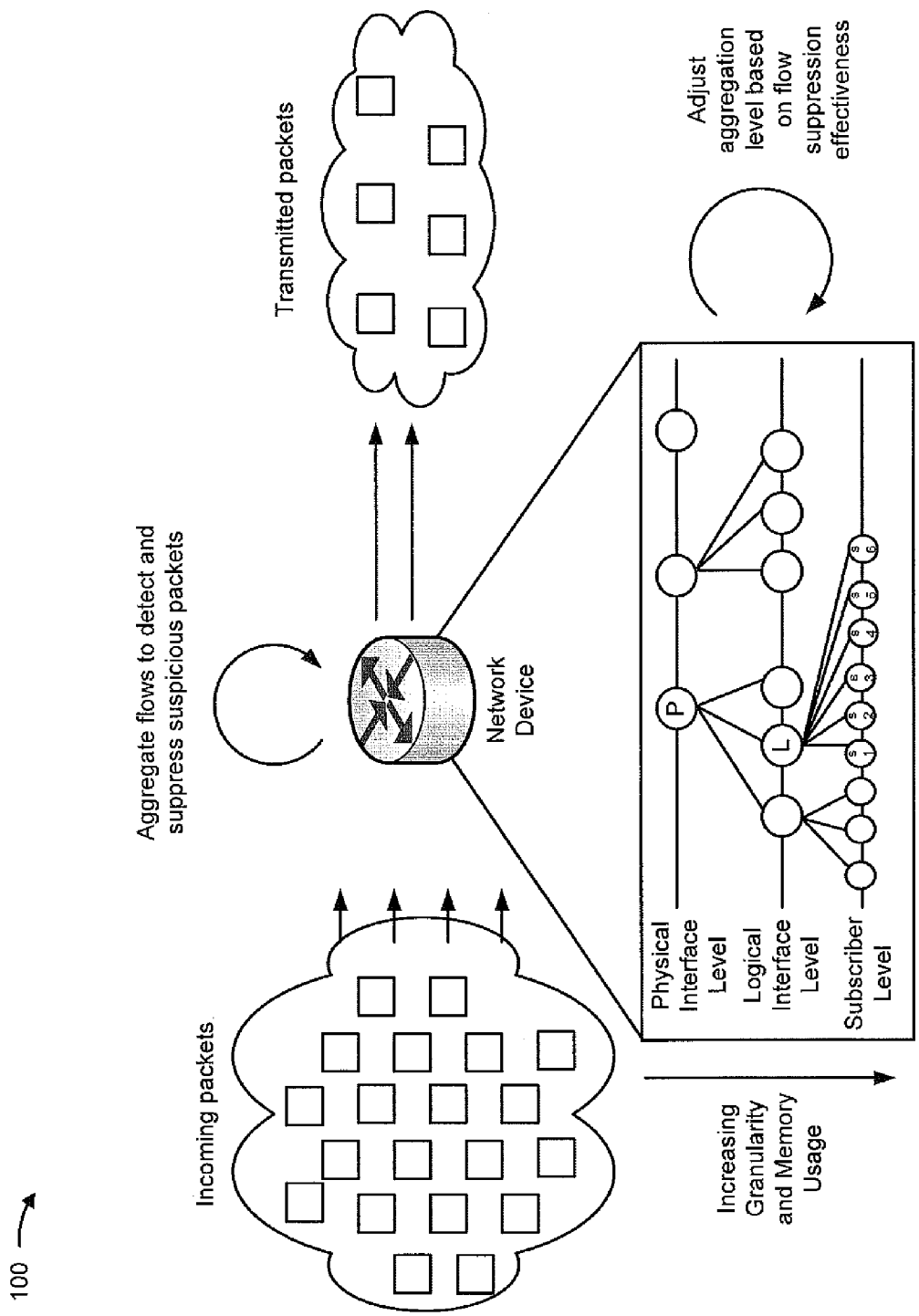
FIG. 1 is a diagram of an overview of an example implementation described herein.

FIG. 1 is a diagram of an overview of an example implementation 100 described herein. As shown in FIG. 1, example implementation 100 may include a network device that may receive a quantity of incoming packets (e.g., from one or more source devices via a network) to be re-transmitted (e.g., to one or more destination devices via a network). The network device may determine that the quantity of incoming packets exceeds an allowable bandwidth (e.g., as may occur during a DDoS attack), and may utilize one or more flow monitoring processes, such as a flow suppression process (e.g., a flow detection process, a flow passing process, a flow dropping process, a flow study process, a flow maintenance process, etc.), a flow aggregation process, or the like, to manage the quantity of network traffic by distinguishing unwanted packets from critical network signaling and system control packets.

The network device may aggregate packets into traffic flows (e.g., by grouping packets based on a common identifier, such as a network address identifier, a port identifier, or the like). The packets may be aggregated into flows of increasing granularity (e.g., a quantity of packets may be grouped into a flow based on a single common port identifier, and may be sub-grouped into a more granular flow based on multiple common network address identifiers).

The granularity with which flows are formed from grouping packets may be described by one or more aggregation levels, such as a protocol level (e.g., aggregation by a protocol type), a physical interface level (e.g., aggregation by a source port), a logical interface level (e.g., aggregation by a sub-interface of the physical interface), a subscriber level (e.g., aggregation by a network address), or the like. For example, a quantity of packets (e.g., a flow) associated with a particular network protocol (e.g., border gateway protocol (BGP), open shortest pathway first (OSPF) protocol, etc.) may be subdivided into multiple smaller quantities of packets (e.g., finer flows) based on arrival port identifiers, and each subdivision may be subdivided into multiple even smaller quantities of packets (e.g., even finer flows) based on associations with multiple virtual local area networks (VLANs). Conversely, multiple subdivisions of packets, grouped into flows based on VLAN identifiers, may be aggregated based on a common port identifier to form a new coarser flow. Similarly, the new coarser flow may be aggregated with other flows associated with common VLAN identifiers based on a common network protocol to form even coarser flows.

The network device may adjust a current aggregation level based on one or more measurements indicating that flow suppression is not effective at the current aggregation level. The measurements may include a bandwidth violation trend (e.g., a measure of the controlled packet pass rate as compared to a threshold rate over one or more observation periods), a flow-dropping trend (e.g., a measure of whether the rate at which problem flows are identified and suppressed is increasing, decreasing, or staying the same), or the like. Based on the measurements of flow suppression effectiveness, the network device may determine that the current aggregation level is not granular enough to effectively suppress packets, and may adjust the granularity level with which packets are to be grouped into flows by determining a new aggregation level.

The network device may set flow aggregation to a finest available level, and may aggregate to coarser flows when flow control at finer levels is not effective. When the network device determines the new aggregation level (e.g., an aggregation level that results in better flow suppression effectiveness than the current aggregation level), the network device may update a data structure (e.g., a search-map) to identify the new aggregation level. The network device may utilize the updated data structure to determine the level of flow aggregation that is to be used during future flow suppression. When a total quantity of arrival traffic for a packet type is at or below a particular threshold, the network device may reset aggregation to the finest allowed aggregation level. Additionally, or alternatively, the network device may reset aggregation to the finest allowed aggregation level if the bandwidth violation trend and/or the flow-dropping trend satisfies a threshold (e.g., equal to zero) after a particular amount of time has elapsed.

In this way, the network device may determine the finest level at which to aggregate flows in order to pinpoint a traffic problem precisely, and to avoid penalizing good traffic flows. This trend-based aggregation level adjustment may aid the network device in detecting and suppressing packets, associated with suspicious flows (e.g., non-critical flows that satisfy an incoming bandwidth restriction), without suppressing critical network signaling and/or system control packets, and without excessive system resource utilization.

Figure 2:
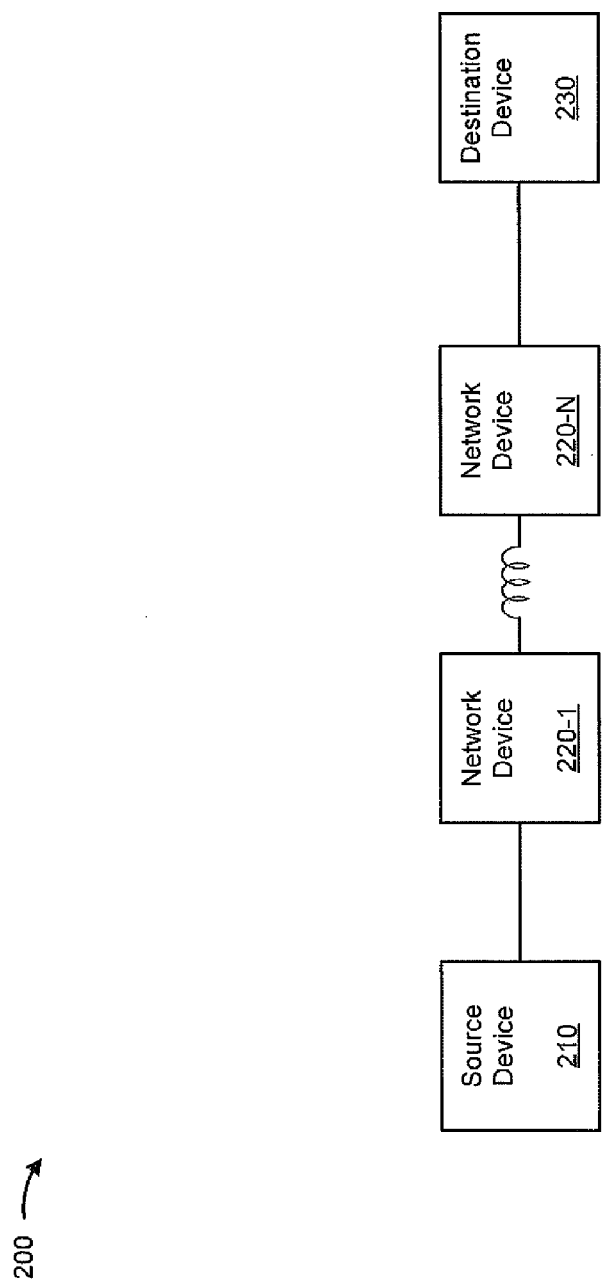
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a source device 210, one or more network devices 220-1 through 220-N (N≥1) (hereinafter referred to collectively as "network devices 220" and individually as "network device 220"), and a destination device 230. Devices of environment 200 may interconnect via wired connections, wireless connections, or a combination of wired and wireless connections.

Source device 210 may include one or more devices capable of generating, processing, and/or providing network traffic to destination device 230 via one or more network devices 220. For example, source device 210 may include a user device (e.g., a computer, a mobile device, etc.), a server device, an access point, a gateway, or the like. In some implementations, source device 210 may provide one or more packets to network device 220 for transmission to destination device 230. In some implementations, source device 210 may be associated with a particular network address, a particular port number, a particular transmission protocol, or the like. In some implementations, there may be multiple source devices 210 providing traffic to network device 220. For example, during a DDoS attack, network device 220 may receive network traffic from one or more suspicious source devices 210 that are engaged in the DDoS attack and one or more non-suspicious source devices 210 that are not engaged in the DDoS attack. In this case, network device 220 may process incoming packets to distinguish suspicious packets from unsuspicious packets.

Network device 220 may include one or more devices capable of receiving, generating, processing, storing, and/or providing network traffic from source device 210 to destination device 230. For example, network device 220 may include one or more traffic transfer devices, such as a router, a gateway, a server, a hub, a switch, a bridge, a network interface card (NIC), an optical add-drop multiplexer (OADM), an Ethernet device, an Ethernet back haul (EBH) device, or the like. In some example implementations, network device 220 may include one or more routers implementing one or more software processes, such as a virtual machine router, an internet protocol (IP) router, or the like. In some implementations, network device 220 may forward packets (e.g., data packets) from source device 210 to destination device 230 or another network device 220. In some implementations, network device 220 may include computing resources (e.g., processing resources, storage resources, etc.) that may be used for flow suppression and/or for determining flow suppression effectiveness. In some implementations, a network control plane of network device 220 may be attacked via a DDoS attack.

Destination device 230 may include one or more devices capable of receiving, processing, and/or storing network traffic from source device 210 (e.g., via a network). For example, destination device 230 may include a user device (e.g., a computer, a mobile device, etc.), a server, an access point, a gateway, or the like. In some implementations, destination device 230 may receive one or more packets from source device 210 (e.g., passed by network device(s) 220).

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3B:
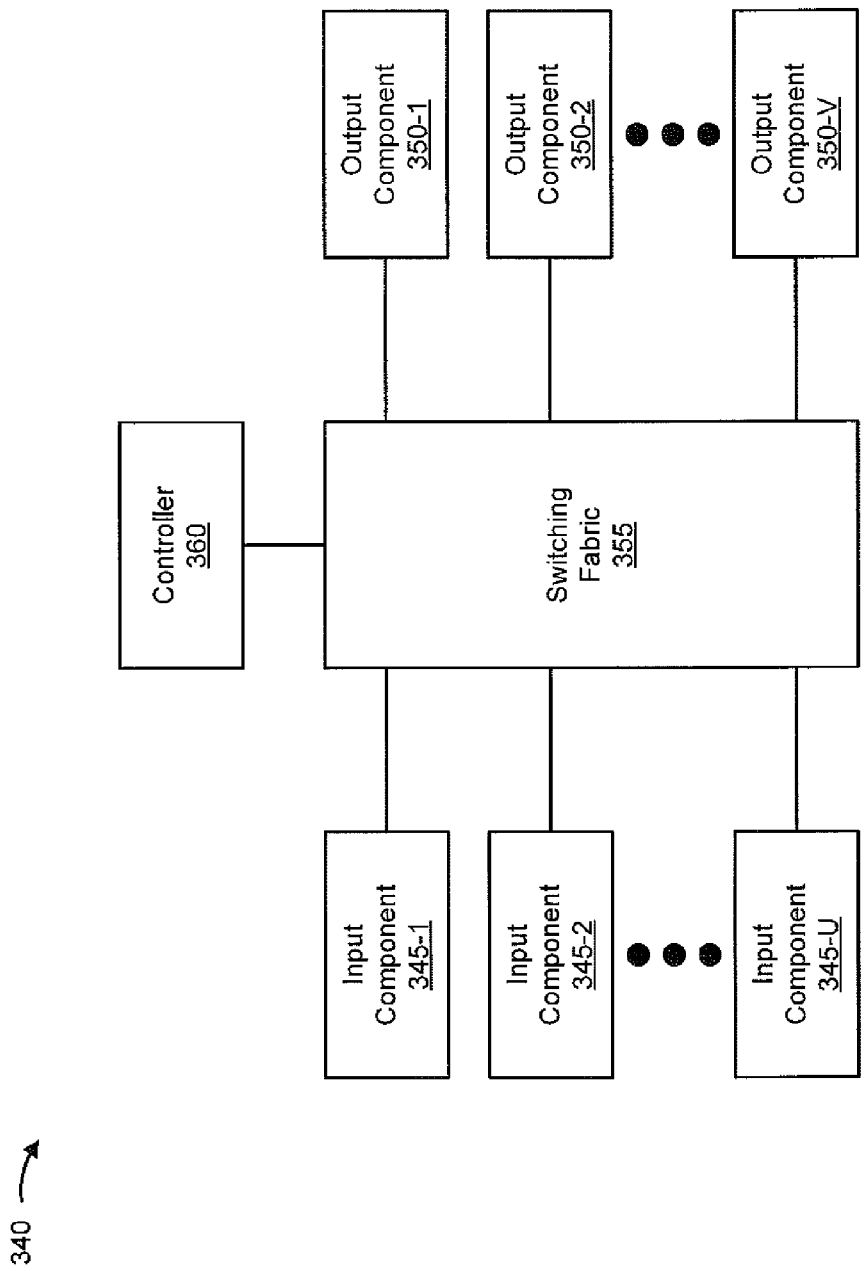

FIGS. 3A and 3B are diagrams of example components of one or more devices of FIG. 2. FIG. 3A is a diagram of example components of a device 305. Device 305 may correspond to source device 210 and/or destination device 230. In some implementations, device 305 may correspond to network device 220. In some implementations, each of source device 210, network device 220, and/or destination device 230 may include one or more devices 305 and/or one or more components of device 305. As shown in FIG. 3A, device 305 may include a bus 310, a processor 315, a memory 320, an input component 325, an output component 330, and a communication interface 335.

Bus 310 may include a component that permits communication among the components of device 305. Processor 315 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 320 may include a random access memory (RAM), a read only memory (ROM), and/or another type of dynamic or static storage device (e.g., a flash, magnetic, or optical memory) that stores information and/or instructions for use by processor 315.

Input component 325 may include a component that permits a user to input information to device 305 (e.g., a touch screen display, a keyboard, a keypad, a mouse, a button, a switch, etc.). Output component 330 may include a component that outputs information from device 305 (e.g., a display, a speaker, one or more light-emitting diodes (LEDs), etc.).

Communication interface 335 may include a transceiver-like component, such as a transceiver and/or a separate receiver and transmitter, that enables device 305 to communicate with other devices, such as via a wired connection, a wireless connection, or a combination of wired and wireless connections. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 305 may perform one or more processes described herein. Device 305 may perform these processes in response to processor 315 executing software instructions included in a computer-readable medium, such as memory 320. A computer-readable medium may be defined as a non-transitory memory device. A memory device may include memory space within a single physical storage device or memory space spread across multiple physical storage devices.

Software instructions may be read into memory 320 from another computer-readable medium or from another device via communication interface 335. When executed, software instructions stored in memory 320 may cause processor 315 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

FIG. 3B is a diagram of example components of a device 340. Device 340 may correspond to network device 220. In some implementations, network device 220 may include one or more devices 340 and/or one or more components of device 340. As shown in FIG. 3B, network device 220 may include one or more input components 345-1, 345-2, . . . , 345-U (U≥1) (referred to collectively as "input components 345" and individually as "input component 345"), one or more output components 350-1, 350-2, . . . , 350-V (V≥1) (referred to collectively as "output components 350" and individually as "output component 350"), a switching fabric 355, and a controller 360.

Input component 345 may include a component or a collection of components to process incoming data (e.g., data received on network links). Input component 345 may manage a port or a collection of ports via which the data can be received. Input component 345 may perform certain operations on incoming data, such as decapsulation, encapsulation, demultiplexing, multiplexing, queuing, etc. operations, that may facilitate the processing and/or transporting of the incoming data by other components of network device 220.

Output component 350 may include a component or a collection of components to process outgoing data (e.g., data transmitted on network links). Output component 350 may manage a port or a collection of ports via which data can be transmitted. Output component 350 may perform certain operations on outgoing data, such as encapsulation, decapsulation, multiplexing, demultiplexing, queuing, prioritizing, etc. operations, that may facilitate the processing and/or transmission of the outgoing data from network device 220.

Switching fabric 355 may include one or more switching planes to facilitate communication among input components 345, output components 350, and/or controller 360. In some implementations, each of the switching planes may include a single or multi-stage switch of crossbar elements. Switching fabric 355 may additionally, or alternatively, include processors, memories, and/or paths that permit communication among input components 345, output components 350, and/or controller 360.

Controller 360 may include one or more processors, microprocessors, application specific integrated circuits (ASICs), field programmable gate arrays (FPGAs), or the like, that are designed for networking and communications. Controller 360 may also include static memory (e.g., a read only memory (ROM)), dynamic memory (e.g., a random access memory (RAM)), cache memory, and/or flash memory for storing data and/or machine-readable instructions. In some implementations, controller 360 may communicate with other network devices 220 to exchange information regarding network topology and labels to facilitate the label switching of data. Controller 360 may perform multiprotocol label switching (MPLS) functions for network device 220, such as label lookups, label popping, swapping, and/or pushing operations, routing decisions, etc. Controller 360 may assist in establishing diverse paths across domains.

The number of components shown in FIGS. 3A and 3B are provided as an example. In practice, device 305 and/or device 340 may each include additional components, fewer components, different components, or differently arranged components than those shown in FIGS. 3A and 3B.

Figure 4:
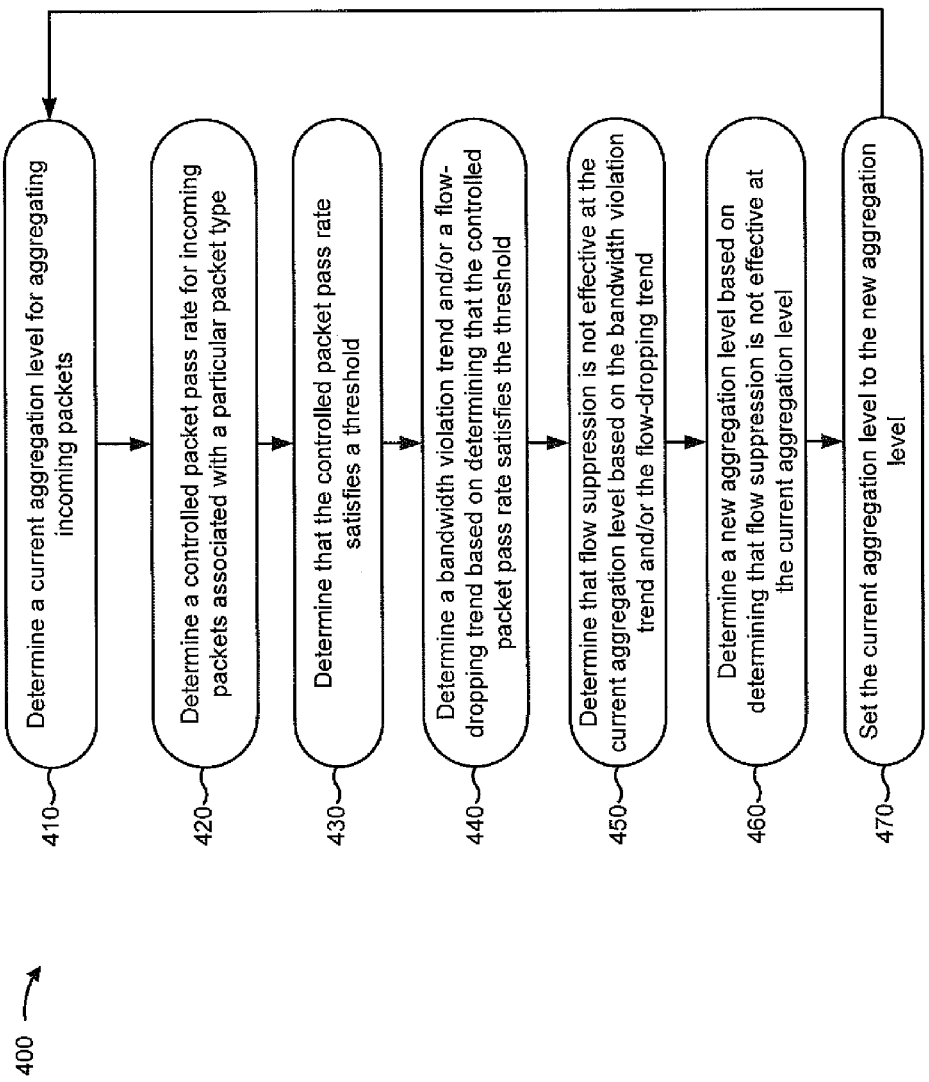
FIG. 4 is a flow chart of an example feedback loop process for trend-based adjustment of a flow aggregation level.

FIG. 4 is a flow chart of an example feedback loop process for trend-based adjustment of a flow aggregation level. In some implementations, one or more process blocks of FIG. 4 may be performed by network device 220. Additionally, or alternatively, one or more process blocks of FIG. 4 may be performed by another device or a group of devices separate from or including network device 220, such as a server in communication with network device 220.

As shown in FIG. 4, process 400 may include determining a current aggregation level for aggregating incoming packets (block 410). For example, network device 220 may determine the current aggregation level used for aggregating incoming packets into detectable and measurable flows. An aggregation level may describe an identifier with which packets, of the incoming packets, are detected and/or grouped into flows for further processing during flow suppression. An aggregation level may include a physical interface level (e.g., detecting and/or grouping packets based on an incoming port identifier), a logical interface level (e.g., detecting and/or grouping packets based on a logical interface identifier), a subscriber level (e.g., detecting and/or grouping packets based on a source network address identifier), or the like.

A finer aggregation level may refer to grouping the packets based on a more granular identifier. For example, multiple packets that are grouped together based on a single shared logical interface identifier, the group corresponding to a single individual flow, may be divided into subgroups based on network address identifiers, each subgroup corresponding to another individual flow. In this case, network device 220 may aggregate packets using an aggregation level that is finer than the logical interface level by aggregating packets using the subscriber level. Similarly, network device 220 may aggregate packets using an aggregation level finer than the physical interface level (e.g., aggregation by incoming port identifier) by aggregating the packets using the logical interface level. Conversely, the network device 220 may aggregate packets using a coarser aggregation level than the subscriber level by using the logical interface level, and may aggregate packets using a coarser level than the logical interface level by aggregating packets using the physical interface level.

The current aggregation level may refer to the aggregation level being used by network device 220 to detect and/or suppress packets, in some implementations. For example, network device 220 may determine the current aggregation level based on the packet type of an incoming packet. In some implementations, network device 220 may determine the current aggregation level associated with a particular packet type based on a data structure storing aggregation level information. For example, the data structure may store an identifier of the aggregation level that is to be used for the packet type of the incoming packet. In this case, network device 220 may utilize a first aggregation level as the current aggregation level for a first packet type (e.g., a first current aggregation level) and a second aggregation level as the current aggregation level for a second packet type (e.g., a second current aggregation level). In some implementations, different aggregation levels may be used for different packet types and/or traffic conditions (e.g., a quantity of flows, a flow arrival rate, a flow drop rate, a controlled packet pass rate, etc.).

The current aggregation level may be an initial aggregation level, in some implementations. For example, network device 220 may initialize the current aggregation level to a default aggregation level. In some implementations, the current aggregation level may be initialized to the finest allowable aggregation level. For example, when network device 220 initializes the aggregation level from amongst the physical interface level, the logical interface level, and the subscriber level, network device 220 may initialize the current aggregation level to the subscriber level (e.g., because the subscriber level is the finest aggregation level of the physical interface level, the logical interface level, and the subscriber level).

The current aggregation level may be associated with a flow control mode, in some implementations. For example, network device 220 may determine, based on the aggregation level, a control action for incoming packets (e.g., an action governing how incoming packets are to be handled), such as a "drop" action (e.g., dropping incoming packets, thus entirely suppressing the flow), a "keep" action (e.g., passing incoming packets, where the packets are measured, but the packets are not dropped or suppressed), a police action (e.g., policing incoming packets to determine whether the incoming packets are unwanted packets, where the rate of the flow that includes the packets may be capped at a particular threshold, such as the flow bandwidth rate), or the like. Each aggregation level may be configured with a set of control modes, in some implementations. A same control action may be applied to all flows detected based on the current aggregation level and packet type. In this case, when network device 220 determines to police incoming packets, packets may be aggregated into flows, and flow suppression may be performed on the flows.

The incoming packets may arrive from one or more source devices 210, in some implementations. For example, source devices 210 may transmit one or more packets to network device 220 to be provided to destination device 230. Additionally, or alternatively, prior to reaching a particular network device 220 that is to control excess network traffic (e.g., by suppressing problem packets), the incoming packets may arrive from the one or more source devices 210 via one or more other network devices 220.

As further shown in FIG. 4, process 400 may include determining a controlled packet pass rate, for incoming packets associated with a particular packet type (block 420). For example, network device 220 may determine the controlled packet pass rate for incoming packets (e.g., a quantity of incoming packets per time period), associated with the particular packet type. Network device 220 may determine the controlled packet pass rate by determining a rate of packets not dropped by a flow dropping process (e.g., by subtracting a flow drop rate from a packet arrival rate). A packet type (e.g., a control packet type) may include a type of message sent between computing clients (e.g., from source device 210 to destination device 230), such as a point-to-point protocol over Ethernet active discovery initiation (PPPoE-PADI) message, a dynamic host configuration protocol discover (DHCP-discover) message, or the like. In some implementations, the controlled packet pass rate may be associated with multiple packet types. For example, the controlled packet pass rate may be determined based on the quantity of all DHCP-type messages. In some implementations, network device 220 may treat a protocol group as a particular type of packet.

Network device 220 may determine, based on the packet type and the packet type's current aggregation level, a set of keys to be used to uniquely identify a flow. For example, a key set such as [source address, port] may be used to identify multiple flows using a source address and a port identified in a packet header of an incoming packet. The key set may include, for example, a physical level identifier, a logical level identifier, a subscriber level identifier, or the like.

Network device 220 may track detected flows in a flow table, in some implementations. The table may include a hash table, or a set of hash tables. For example, network device 220 may use a key set associated with the current aggregation level to determine whether an incoming flow (e.g., an incoming packet) is included in the flow table (e.g., based on determining whether the key set is identified in the flow table). If the flow is included in the flow table, network device 220 may increment a packet counter for the flow for each incoming packet associated with the flow. If the flow is not included in the flow table, network device 220 may insert information identifying the flow into the flow table (e.g., using the key set). Network device 220 may use the flow table to measure various flow characteristics described herein, such as arrival rate, drop rate, controlled packet pass rate, etc. In some implementations, a single packet may belong to multiple flows, such as when the information included in the packet matches multiple key sets associated with multiple flows and/or aggregation levels. For example, a single packet may belong to multiple flows if multiple aggregation levels are activated (e.g., turned "On").

Network device 220 may measure controlled packet pass rates for flows in the flow table. If the measured controlled packet pass rate for a flow satisfies a threshold (e.g., greater than or equal to a threshold associated the packet type and the packet type's current aggregation level), the flow may be determined to be a culprit flow, and may be controlled (dropped, policed, and/or monitored). As an example, network device 220 may drop all flows that belong to the packet type at the first aggregation level. Otherwise, the flow may be identified as a false positive flow, and may be removed from the table (e.g., when the controlled packet pass rate for the flow is below the threshold). In this way, only the true culprit flows are kept in the table to be tracked and controlled. In some implementations, the table may store flows that belong to multiple packet types and aggregations. Additionally, or alternatively, multiple tables may be used to store flows of different packet types and/or aggregation levels.

As further shown in FIG. 4, process 400 may include determining that the controlled packet pass rate satisfies a threshold (block 430). For example, network device 220 may determine that the controlled packet pass rate for the particular packet type satisfies an allowable bandwidth for the packet type. In some implementations, network device 220 may receive information identifying an allowable bandwidth associated with the particular packet type (e.g., from a control device). For example, the allowable bandwidth may be associated with a quantity of network traffic capable of being processed by network device 220, such as a quantity of packets per time period (e.g., per second), a quantity of bits per time period, or the like. In some implementations, allowable bandwidth may be computed dynamically. For example, allowable bandwidth may be determined based on a current state of network device 220, a current system resource accessibility of network device 220, etc. Process 400 may include a feedback loop that iteratively adjusts one or more flow aggregation levels to control the quantity of dropped packets, and to bring the controlled packet pass rate within an acceptable threshold level (e.g., below a threshold value). The current aggregation level may be used as a loop control variable that controls the feedback loop. The loop feedback may represent the effectiveness of flow dropping.

As further shown in FIG. 4, process 400 may include determining a bandwidth violation trend and/or a flow-dropping trend based on determining that the controlled packet pass rate satisfies the threshold (block 440). For example, network device 220 may determine the bandwidth violation trend and/or the flow-dropping trend-based on one or more network measurements, such as an incoming packet measurement, a flow-drop measurement, a controlled packet pass rate (e.g., a packet arrival rate minus a packet drop rate), or the like. In some implementations, network device 220 may determine the bandwidth violation trend based on an arrival rate of packets that are not dropped (e.g., based on a controlled packet pass rate).

Network device 220 may determine the bandwidth violation trend using a bitmap to measure a quantity of bandwidth violations during multiple time periods, in some implementations. For example, the bandwidth violation trend may include an n-bitmap (n≥1), representing whether a bandwidth violation occurred during the last n time periods over a rolling observation period (e.g., of length n time periods). Network device 220 may determine that a bandwidth violation occurred at a particular time period based on whether the packet arrival rate and/or a controlled packet pass rate at the particular time period satisfies (e.g., is greater than, is greater than or equal to, etc.) the allowable bandwidth for the packet type.

For example, network device 220 may compute the bandwidth violation trend:

$$\text{Violation bit} = \{1, \text{ if: } R \geq R_P\}$$

$$\{0, \text{ if: } R < R_P\}$$

$$\text{Trend}_{violation} = (\text{Trend}_{violation} << 1) | \text{Violation bit}$$

In the above expressions, Violation bit represents a bit, R represents the controlled packet pass rate for packets of a packet type, $R_P$ represents the allowable bandwidth for the packet type, $\text{Trend}_{violation}$ represents an n-bit bitmap of the bandwidth violation trend, "<<1" represents the bitwise operation of removing the left-most bit from the bitmap (e.g., the nth bit, which represents the least recent Violation bit) and shifting each subsequent bit to the left, and "|" represents the bitwise logical operation "OR" (e.g., inclusive OR) that resolves the right-most bit (e.g., the first bit, which represents the most recent Violation bit), to the value of the calculated Violation bit. Network device 220 may determine a Violation bit, may remove the least recent Violation bit from the $\text{Trend}_{violation}$ bitmap (e.g., the nth bit), and may add the newly determined Violation bit onto the $\text{Trend}_{violation}$ bitmap. In some implementations, the bandwidth violation trend bitmap may be initialized to a particular value (e.g., all 0's, all 1's, a first quantity of 0's and a second quantity of 1's, or the like).

Network device 220 may determine the flow-dropping trend by adding a Flow-Drop bit onto a bitmap, in some implementations. The Flow-Drop bit represents whether the rate at which packets included in controlled flows of the current flow aggregation level(s) are being dropped by network device 220 is increasing. In some implementations, the equation for determining the Flow-Drop bit may include a tunable parameter for filtering out high frequency noise in the flow-drop rate.

For example, network device 220 may compute the flow-dropping trend:

$$\text{Flow-Drop bit} = \{1, \text{if: } R_{Drop}[n] - R_{Drop}[n-1]) \leq ((R_{Drop}[n] + R_{Drop}[n-1] + \ldots R_{Drop}[n-m])/2^r)\}$$

$$\{0, \text{if: } R_{Drop}[n] - R_{Drop}[n-1]) > ((R_{Drop}[n] + R_{Drop}[n-1] + \ldots R_{Drop}[n-m])/2^r)\}$$

$$\text{Trend}_{flow\text{-}dropping} = (\text{Trend}_{flow\text{-}dropping} << 1) | \text{Flow-Drop bit}$$

In the above expressions, Flow-Drop bit represents a bit, $R_{Drop}[n]$ represents a flow-drop rate at time period n, $R_{Drop}[n-m]$ represents a flow-drop rate at time period n-m, n represents a time period, r represents a tunable parameter (e.g., that may be adjusted to filter out high frequency noise), m represents a tunable parameter (e.g., that may be adjusted to change a quantity of time periods over which the trend is measured), $\text{Trend}_{flow\text{-}dropping}$ represents an n-bit bitmap of the flow-dropping trend, "<<1" represents the bitwise operation of removing the left-most bit from the bitmap (e.g., the nth bit, which represents the least recent Flow-Drop bit) and shifting each subsequent bit to the left, and "|" represents the bitwise logical operation "OR" (e.g., inclusive OR) that resolves the right-most bit (e.g., the first bit, which represents the most recent Flow-Drop bit), to the value of the calculated Flow-Drop bit. Network device 220 may determine a Flow-Drop bit, may remove the least recent Flow-Drop bit (e.g., the nth bit) from the $\text{Trend}_{flow\text{-}dropping}$ bitmap, and may add the newly determined Flow-Drop bit onto the $\text{Trend}_{flow\text{-}dropping}$ bitmap. In some implementations, the flow-dropping trend bitmap may be initialized to a particular value (e.g., all 0's, all 1's, a first quantity of 0's and a second quantity of 1's, or the like).

As further shown in FIG. 4, process 400 may include determining that flow suppression is not effective at the current aggregation level based on the bandwidth violation trend and/or the flow-dropping trend (block 450). For example, network device 220 may determine that flow aggregation at the current aggregation level has been ineffective.

Network device 220 may determine that the flow dropping has failed to reduce bandwidth of a particular packet type, at a current aggregation level, to an acceptable level (e.g., failed to satisfy a bandwidth threshold) during a quantity of time periods (e.g., over the last n time periods), in some implementations. For example, network device 220 may determine, based on the $\text{Trend}_{violation}$ bitmap, that bandwidth satisfied a bandwidth threshold a threshold quantity of time periods (e.g., represented by a threshold quantity of bits, in the bitmap, that equal a first value, such as 1). In some implementations, network device 220 may determine, based on the $\text{Trend}_{violation}$ bitmap, that bandwidth did not satisfy the bandwidth threshold a threshold quantity of time periods during the rolling observation period (e.g., represented by a threshold quantity of bits, in the bitmap, that equal a second value, such as 0)

Network device 220 may determine that the flow-dropping rate has not increased during the rolling observation period (e.g., over the last n time periods), in some implementations. For example, network device 220 may determine, based on the $\text{Trend}_{flow\text{-}dropping}$ bitmap, that flow-dropping has not increased during a threshold quantity of time periods (e.g., represented by a threshold quantity of bits, in the bitmap, that equal the first value). In some implementations, network device 220 may determine, based on the $\text{Trend}_{flow\text{-}dropping}$ bitmap, that flow-dropping increased (e.g., represented by a threshold quantity of bits, in the bitmap, that equal the second value).

In some implementations, a threshold quantity of bits may include all of the bits in the bitmap (e.g., n bits in an n-bit bitmap). For example, network device 220 may determine that the flow-dropping rate has not increased during the rolling observation period based on all the bits of the $\text{Trend}_{flow\text{-}dropping}$ bitmap indicating that the flow-dropping rate has not increased (e.g., all of the bits being the first value). Additionally, or alternatively, the threshold quantity of bits may include less than all of the bits in the bitmap (e.g., less than n bits in an n-bit bitmap). For example, network device 220 may determine that the flow-dropping rate has not increased during a threshold quantity of time periods during the rolling observation period based on the quantity (e.g., a percentage, a discrete value, etc.) of the bits of the $\text{Trend}_{flow\text{-}dropping}$ bitmap indicating that the flow-dropping rate has not increased.

Network device 220 may determine that flow suppression is not effective based on determining that the packet policer rate (e.g., a threshold) for the packet type is still being violated and/or based on determining that the flow-dropping rate has not increased, in some implementations (e.g., flow suppression is not effective because flows are arriving at rates below the detectable bandwidth of the aggregation level). For example, network device 220 may determine that flows have not been aggregated enough for flow suppression to be effective. In this case, network device 220 may determine that the aggregation level is to be adjusted to a coarser aggregation level (e.g., changed from the subscriber level to the logical interface level, changed from the logical interface level to the physical interface level, etc.). A coarser aggregation level, such as a logical interface level as compared to a subscriber level, may refer to an aggregation level at which more packets, associated with a common identifier, are to be aggregated together resulting in flows that are less granular, but have a greater controlled packet pass rate, when searching for problem flows during flow suppression. This greater controlled packet pass rate may cross a bandwidth threshold at the respective coarser aggregation level and thus be detected and controlled (e.g., policed or dropped) by network device 220.

In some implementations, network device 220 may determine that the aggregation level is to be set to a finer aggregation level (e.g., changed from the physical interface level to the logical interface level, changed from the logical interface level to the subscriber level, etc.). A finer aggregation level, such as a subscriber level as compared to a logical interface level, may refer to an aggregation level at which fewer packets, associated with a common identifier, are to be aggregated together resulting in flows that are more granular, but have lower bandwidth, when searching for problem flows during flow suppression.

In some implementations, network device 220 may set the aggregation level to a finer level when a quantity of measured arrival traffic satisfies a threshold (e.g., is equal to or less than a threshold) after a particular amount of time has elapsed (e.g., a particular amount of time since network device 220 set the aggregation level to a coarser level). Additionally, or alternatively, network device 220 may set the aggregation level to a finer level if the bandwidth violation trend and/or the flow-dropping trend satisfies a threshold (e.g., if all bits are equal to zero, if a threshold quantity and/or percentage of bits are equal to zero, etc.) after a particular amount of time has elapsed (e.g., a particular amount of time since network device 220 set the aggregation level to a coarser level). In some implementations, network device 220 may reset the aggregation level to a finest available level (e.g., a finest available level identified in the search map).

As further shown in FIG. 4, process 400 may include determining a new aggregation level based on determining that flow suppression is not effective at the current aggregation level (block 460). For example, network device 220 may determine the new aggregation level to be a different aggregation level than the current aggregation level.

Network device 220 may determine the new aggregation level to be coarser than the current aggregation level, in some implementations. For example, network device 220 may determine that flow aggregation is to be increased when flow suppression is determined not to be effective because packet dropping (e.g., from flow control) has failed to reduce bandwidth to an acceptable (e.g., threshold) level during the rolling observation period and/or because the flow-dropping rate has failed to increase during a threshold quantity of observation periods. In this case, network device 220 may determine the new aggregation level to be coarser than the current aggregation level (e.g., grouping incoming packets into flows that are less granular). For example, network device 220 may determine the new aggregation level to be the logical interface level when the current aggregation level is the subscriber level.

Network device 220 may determine the new aggregation level to be finer than the current aggregation level, in some implementations. For example, network device 220 may set the new aggregation level to a finer level (e.g., the finest allowable level indicated in the search map) based on the flow-dropping trend and/or the bandwidth violation trend satisfying a threshold (e.g., for a particular amount of time, after a particular amount of time, etc.), based on determining that a particular amount of time has passed since the aggregation level was set to a coarser aggregation level, based on an incoming packet arrival rate satisfying a threshold, based on the controlled packet pass rate satisfying a threshold, or the like. As an example, network device 220 may determine the new aggregation level to be the subscriber level when the current aggregation level is the logical interface level.

Network device 220 may determine the new aggregation level to be a next allowable aggregation level based on a data structure (e.g., a search-map) that stores indicators of allowable aggregation levels, in some implementations. An allowable aggregation level may refer to an aggregation level that may be selected to be used by network device 220 to control packet aggregation (e.g., as compared to the current aggregation level that is being used by network device 220 to control packet aggregation). For example, the data structure may store an operation mode associated with an aggregation level. An operation mode may refer to an indicator of whether network device 220 is to perform aggregation at a particular aggregation level. For example, if the operation mode of the logical interface level is set to "OFF," network device 220 may pass over the logical interface level when determining the new aggregation level.

Additionally, or alternatively, if the operation mode of the subscriber level is set to "Automatic," network device 220 may set the subscriber level as the new aggregation level. In this case, if the current aggregation level is the physical interface level and network device 220 determines that the new aggregation level is to be finer than the current aggregation level, network device 220 may pass over the logical interface level, and may set the new aggregation level to the subscriber level. Additionally, or alternatively, if network device 220 is using the subscriber level as the current aggregation level and the new aggregation level is to be coarser than the current aggregation level, network device 220 may skip the logical interface level and set the new aggregation level to the physical interface level (e.g., if the physical interface level was set to Automatic or ON).

As further shown in FIG. 4, process 400 may include setting the current aggregation level to the new aggregation level (block 470). For example, network device 220 may set the new aggregation level as the current aggregation level. In some implementations, network device 220 may update a data structure (e.g., a search-map) associated with determining the current aggregation level, based on the new aggregation level. A search-map may refer to a data structure that identifies the aggregation levels at which network device 220 may search for traffic flows. For example, network device 220 may set the current aggregation level to the new aggregation level by changing a search-map field corresponding to the packet type and the new aggregation level to On (e.g., indicating that the corresponding aggregation level is to be used as the current aggregation level), and by changing a search-map field corresponding to the current aggregation level to Off.

The data structure may indicate multiple aggregation levels at which network device 220 is to search for suspicious flows, in some implementations. For example, the data structure may indicate that aggregation is to be performed at the subscriber level and the logical interface level. In this case, network device 220 may update the data structure to set a current aggregation level of the multiple aggregation levels to the new aggregation level, and network device 220 may loop through the multiple aggregation levels, and may search for flows at each aggregation level of the multiple aggregation levels. In some implementations, the order in which network device 220 loops through the multiple aggregation levels may be determined based on a granularity associated with each of the multiple aggregation levels (e.g., most granular to least granular, least granular to most granular, etc.) and/or a potential resource usage associated with each aggregation level (e.g., most resource intensive to least resource intensive, least resource intensive to most resource intensive, etc.).

Process 400 may continue until an appropriate aggregation level or a set of aggregation levels are determined to be effective at controlling network traffic. One or more aggregation levels may be active at the same time for a packet type, and may be utilized to aggregate flows. Each packet type may be associated with a respective set of aggregation levels. In this way, a network device may utilize trend information to adjust an aggregation level and thereby increase the effectiveness of flow suppression.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5:
FIG. 5 is a diagram of an example data structure that stores information associated with determining one or more aggregation levels at which to perform flow suppression.

FIG. 5 is a diagram of an example data structure 500 that stores information associated with determining one or more aggregation levels at which to perform flow suppression. Data structure 500 may be stored in a memory device (e.g., a RAM, a hard disk, etc.) associated with one or more devices and/or components shown in FIG. 2 and/or FIG. 3. For example, data structure 500 may be stored by network device 220.

Data structure 500 may include a collection of fields, such as a level field 510, an operation mode field 520, and a search-map field 530. In some implementations, data structure 500 may be associated with a particular packet type.

Level field 510 may store an aggregation level identifier for an aggregation level. For example, level field 510 may include one or more characters that uniquely identify an aggregation level, such as a subscriber level identifier, a logical interface level identifier, a physical interface level identifier, or the like. In some implementations, level field 510 may store an aggregation level identifier for a particular source (e.g., a network address identifier for a subscriber aggregation level, a port identifier for a physical interface aggregation level, etc.). An aggregation level identifier may identify a set of keys that network device 220 can use to uniquely identify a flow. For example, a key set such as [source address, port] may be used to identify multiple flows using a source address and a port identified in a packet header of an incoming packet, depending on the variety of source addresses and ports.

Operation mode field 520 may store an indication of an aggregation level that is available for network device 220 to select. For example, operation mode field 520 may include one or more characters that uniquely identify a pre-configured operation mode, such as an On mode (e.g., "Search (F)," indicating that the associated aggregation level is to be used even when flow suppression is effective at another aggregation level), an Automatic mode (e.g., "Automatic (A)," indicating that the associated aggregation level is available for selection by network device 220, based on a bandwidth violation trend and/or a flow-dropping trend), an Off mode (e.g., "Off (X)," indicating that the associated aggregation level is not available for selection), or the like. In this case, when operation mode field 520 is set to automatic, network device 220 may set corresponding search-map field 530 to search, but when operation mode field is set to Off, network device 220 may not set corresponding search-map field 530 to search.

Search-map field 530 may store an indication of whether network device 220 has selected to start flow aggregation for the flow suppression process at a particular aggregation level (e.g., whether an aggregation level, for which the corresponding operation-mode field 520 has not been marked as off, is to be searched). For example, search-map field 530 may include one or more characters that uniquely identify whether network device 220 is to aggregate at a level identified by level field 510, such as an off mode (e.g., "Off (X)," indicating that network device 220 is not to aggregate at an aggregation level identified by a corresponding level field 510), a search mode (e.g., "Search (F)," indicating that network device 220 is to aggregate at an aggregation level identified by a corresponding level field 510), or the like. In this case, when search-map field 530 is set to search, network device 220 is to perform flow aggregation at the corresponding aggregation level (e.g., identified by level field 510).

Information associated with an aggregation level may be conceptually represented as a column in data structure 500. For example, the first column of data structure 500 may correspond to the subscriber aggregation level. Network device 220 may access operation mode field 520 associated with level field 510 to determine that the subscriber level is available to be assigned as an aggregation level, as indicated by the identifier "A" or "On". Network device 220 may access search-map field 530 to determine that the subscriber level is assigned as the current aggregation level for flow aggregation, as indicated by the identifier "F."

Data structure 500 includes fields 510-530 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user, and/or information automatically provided by a device.

Figure 6A:
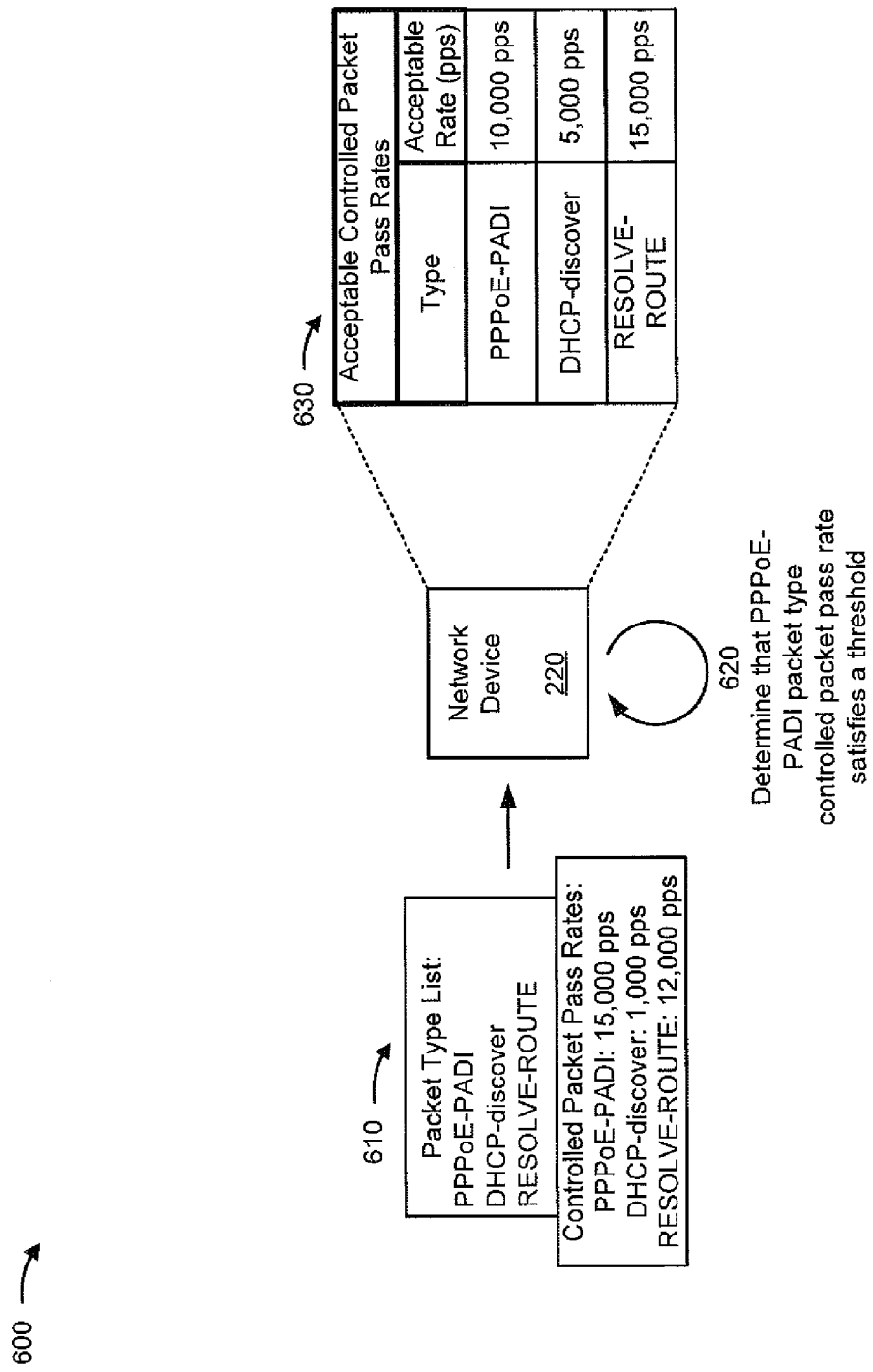
FIGS. 6A-6D are diagrams of an example implementation relating to the example process shown in FIG. 4.

FIGS. 6A-6D are diagrams of an example implementation 600 relating to process 400 shown in FIG. 4. As shown in FIG. 6A, and by reference number 610, network device 220 accesses information indicating packet types (e.g., "Packet Type List"), and determines arrival rates and/or controlled packet pass rates associated with the packet types (e.g., "Controlled Packet Pass Rates"). As shown by reference number 620, network device 220 compares the controlled packet pass rates (e.g., measured in packets per second (pps)) with elements of a data structure storing acceptable type-specific controlled packet pass rates, shown by reference number 630. Assume that network device 220 determines that the PPPoE-PADI packet type controlled packet pass rate (e.g., "15,000 pps") exceeds the threshold acceptable controlled packet pass rate for PPPoE-PADI packets (e.g., "10,000 pps").

Figure 6B:
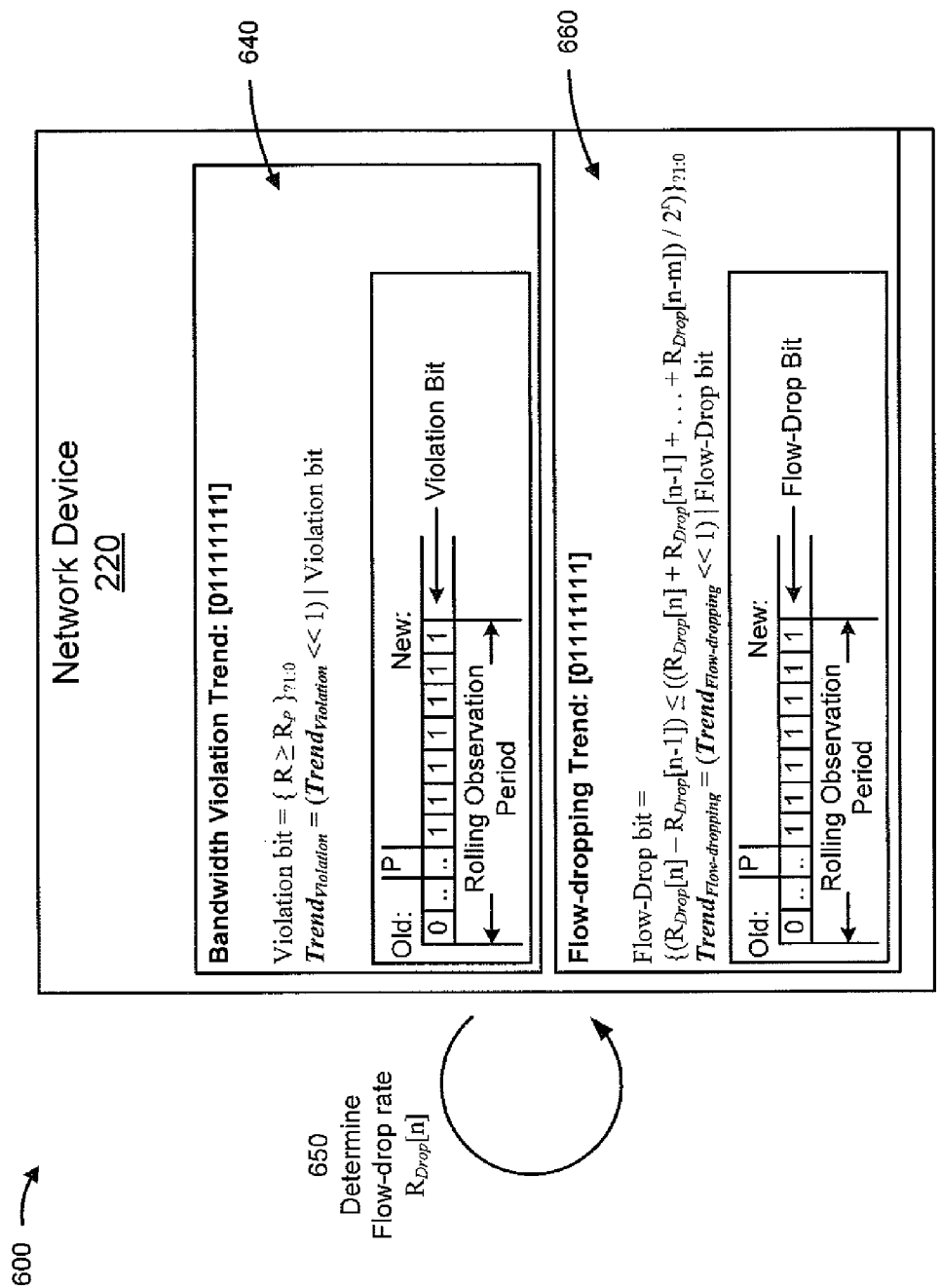

As shown in FIG. 6B, and by reference number 640, network device 220 determines the bandwidth violation trend (e.g., "[01111111]"), removes an old Violation bit (e.g., 0, indicating that bandwidth did not satisfy a bandwidth threshold at the least recent remaining time period n) from the 8-bit bitmap, and adds a new Violation bit (e.g., 1, indicating that bandwidth satisfied the bandwidth threshold at the most recent time period). As shown by reference number 650, network device 220 determines the flow-drop rate (e.g., $R_{Drop}$ [n]). As shown by reference number 660, network device 220 determines the flow-dropping trend (e.g., "[01111111]"), removes an old Flow-Drop bit (e.g., 0, indicating that flow-dropping increased at the least recent, remaining time period) from the 8-bit bitmap, and adds a new Flow-Drop bit (e.g., 1, indicating that the flow-drop rate has not increased during the most recent time period).

Figure 6C:
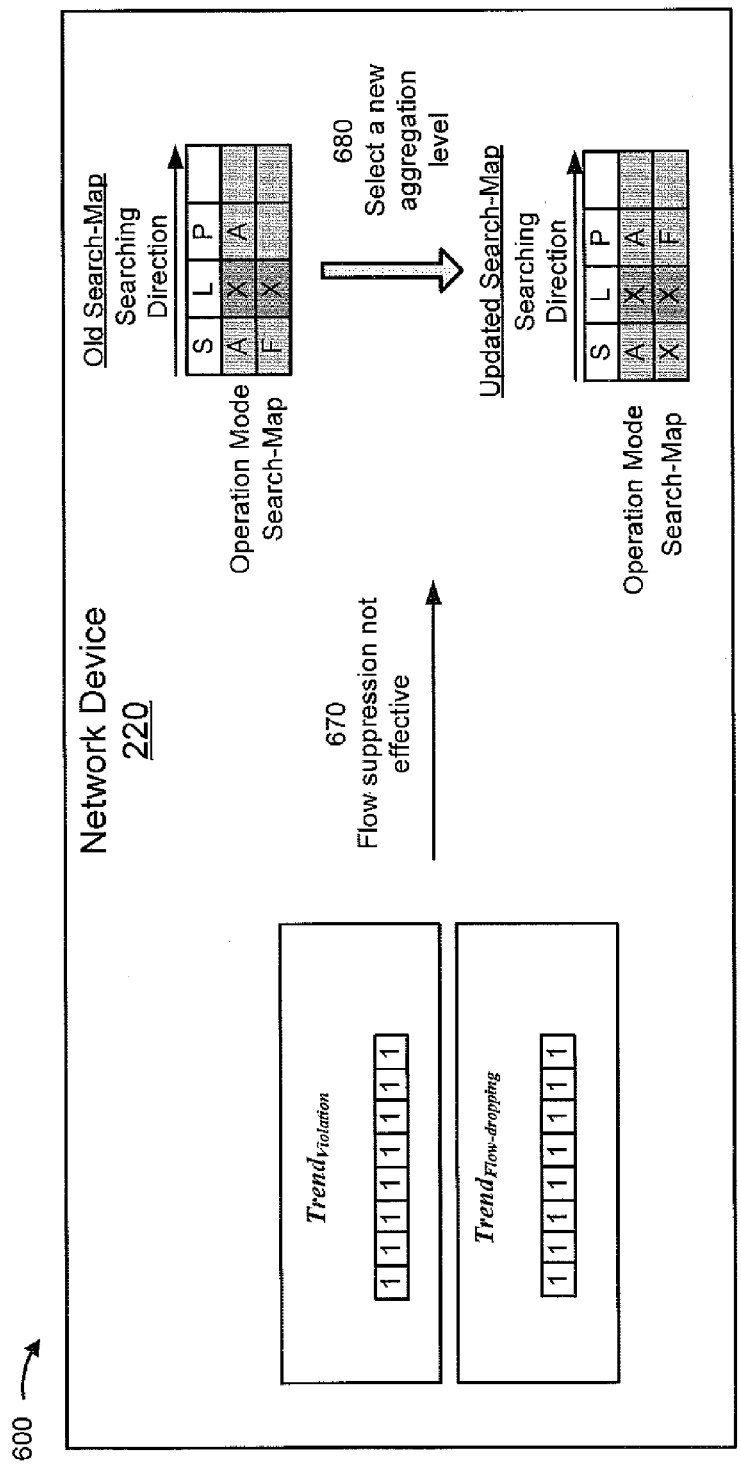

As shown in FIG. 6C, and by reference number 670, assume that the bandwidth violation trend and the flow-dropping trend both indicate that flow suppression has not been effective (e.g., the bandwidth violation trend bitmap indicates that bandwidth has satisfied the bandwidth threshold continuously over the last 8 observation periods, and the flow-dropping trend bitmap indicates that the flow-drop rate has failed to increase over the last 8 observation periods). As shown by reference number 680, a search-map (e.g., "Old Search-Map") is updated to change the current aggregation level from the subscriber level. Network device 220 determines the new aggregation level to be the physical interface level, which is a next available aggregation level identified by the search-map (e.g., because the logical interface level is marked as not being available for use as an aggregation level).

As further shown by reference number 680, network device 220 updates the search-map (e.g., "Updated Search-Map") to set the current aggregation level to the new aggregation level. Updating the search-map includes replacing the subscriber level value (e.g., "F") with a different value (e.g., "X"), thereby indicating that flow aggregation, during flow suppression, is not to occur at the subscriber level. Updating the search-map further includes replacing the physical interface level value (e.g., blank, indicating that flow aggregation has not been enabled at the physical interface level) with a different value (e.g., "F"), thereby indicating that flow aggregation, during flow suppression, is to occur at the physical interface level when packets, of the packet type associated with the search-map, are detected.

Figure 6D:
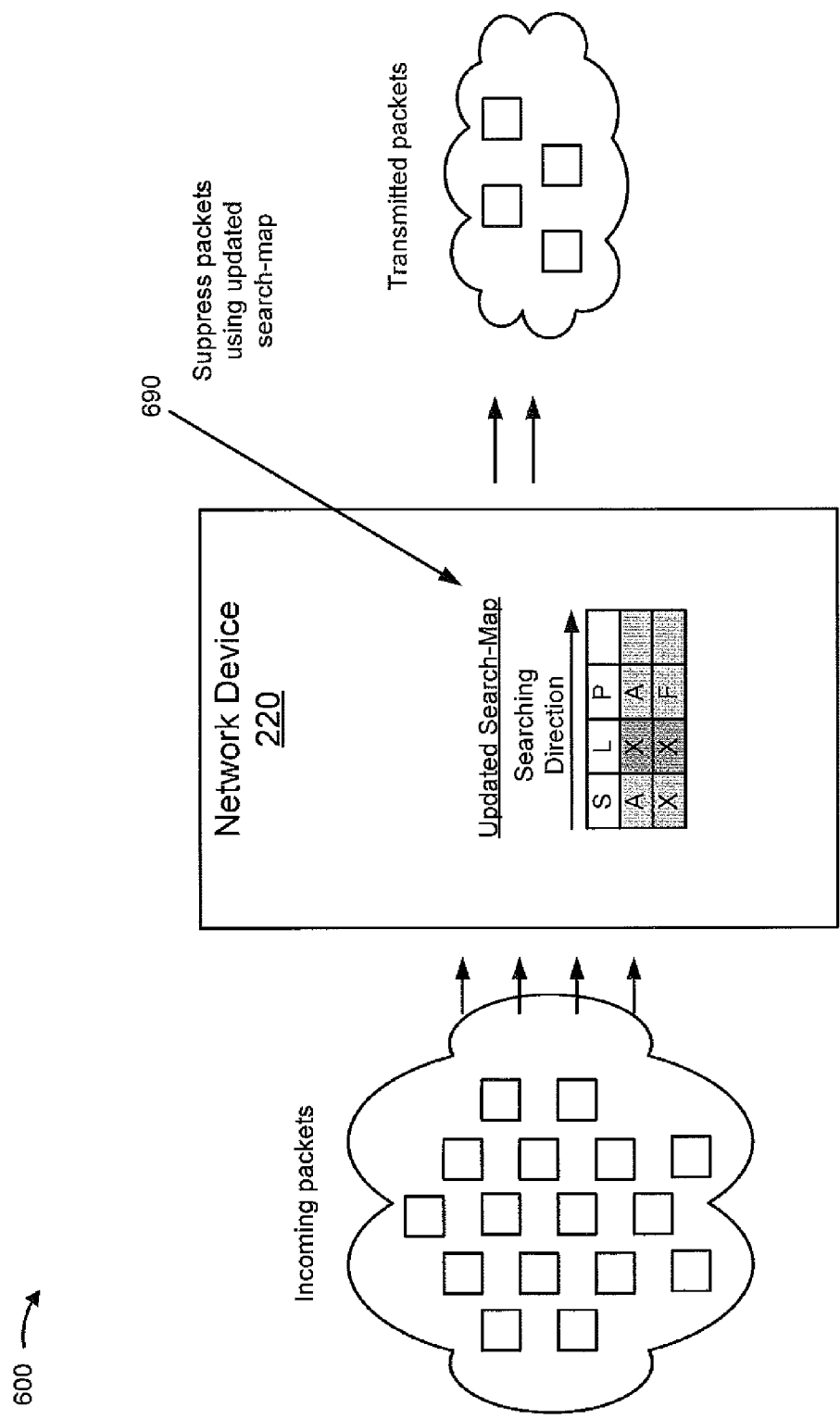

As shown in FIG. 6D, and by reference number 690, assume that network device 220 determines, based on the updated search-map, to aggregate incoming packets at the physical interface level (e.g., based on a port identifier associated with the incoming packets). In this way, network device 220 may aggregate multiple finer flows (e.g., flows at the subscriber level) into a smaller number of coarser flows with higher and detectable controlled packet pass rates (e.g., flows at the physical interface level) for use during flow suppression, and may facilitate detection of a distributed source of problem packets associated with the flows.

As indicated above, FIGS. 6A-6D are provided merely as an example. Other examples are possible and may differ from what was described with regard to FIGS. 6A-6D.

Implementations described herein may allow a network device to dynamically adjust aggregation levels for flow detection and suppression, based on trends measuring the effectiveness of flow detection and suppression, thereby controlling excess network traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein by comparatives, such as coarser, finer, or the like. As used herein, comparatives should be understood to be used in relation to a threshold level, to another relevant comparative, etc., as the context indicates. For example, a coarser aggregation level is to be understood to refer to an aggregation level that is coarser than another aggregation level.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc. Furthermore, some of these phrases, as used herein, may be used interchangeably.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   determine a first aggregation level for aggregating incoming packets;
   aggregate the incoming packets using the first aggregation level;
   determine a controlled packet pass rate for the incoming packets;
   determine that the controlled packet pass rate satisfies an arrival rate threshold based on aggregating the incoming packets using the first aggregation level;
   determine a bandwidth violation trend associated with the incoming packets and the first aggregation level based on determining that the controlled packet pass rate satisfies the arrival rate threshold,
   the bandwidth violation trend indicating a quantity of bandwidth violation observation periods during which the controlled packet pass rate satisfied the arrival rate threshold;
   determine that flow suppression is not effective at the first aggregation level based on the bandwidth violation trend;
   determine a second aggregation level based on determining that flow suppression is not effective at the first aggregation level,
   the second aggregation level being different from the first aggregation level;
   set the first aggregation level to the second aggregation level; and
   use the first aggregation level for aggregating additional incoming packets based on setting the first aggregation level to the second aggregation level.

2. The device of claim 1, where the one or more processors are further to:
   determine that a most recent bandwidth violation observation period, associated with updating the bandwidth violation trend, has expired; and
   where the one or more processors, when determining the bandwidth violation trend, are further to:
   determine the bandwidth violation trend based on determining that the most recent bandwidth violation observation period has expired.

3. The device of claim 1, where the one or more processors are further to:
   detect a set of suspicious traffic flows associated with one or more suspicious packets using the first aggregation level;
   suppress the set of suspicious traffic flows;
   determine a flow-dropping trend based on suppressing the set of suspicious traffic flows,
   the flow-dropping trend indicating a quantity of flow-dropping observation periods during which a rate at which the incoming packets are being dropped is increasing; and
   where the one or more processors, when determining that flow suppression is not effective, are further to:
   determine that flow suppression is not effective based on the flow-dropping trend.

4. The device of claim 1, where the one or more processors are further to:
   determine a flow-drop rate associated with the first aggregation level,
   the flow-drop rate being a measurement of a quantity of incoming packets dropped using flow suppression during a flow-dropping observation period;

determine a tunable parameter to filter out noise associated with the flow-drop rate;
determine a flow-drop bit based on the flow-drop rate and the tunable parameter,
update a data structure associated with a flow-dropping trend based on the flow-drop bit,
the data structure associated with the flow-dropping trend storing one or more of flow-drop bits associated with one or more observation periods;
determine the flow-dropping trend based on updating the data structure associated with the flow-dropping trend; and
where the one or more processors, when determining that flow suppression is not effective, are further to:
determine that flow suppression is not effective based on the flow-dropping trend.

5. The device of claim 1, where the one or more processors are further to:
determine that a most recent bandwidth violation observation period, of the bandwidth violation observation periods, has ended;
determine a bandwidth violation bit associated with the most recent bandwidth violation observation period; and
where the one or more processors, when determining the bandwidth violation trend, are further to:
determine the bandwidth violation trend based on the bandwidth violation bit.

6. The device of claim 1, where the one or more processors are further to:
determine a quantity of bandwidth violation bits associated with the bandwidth violation trend,
each bandwidth violation bit, of the quantity of bandwidth violation bits, being determined based on a comparison between a respective controlled packet pass rate and the arrival rate threshold during a respective plurality of bandwidth violation observation periods;
determine that the quantity of bandwidth violation bits associated with the bandwidth violation trend satisfies a trend threshold; and
where the one or more processors, when determining a second aggregation level, are further to:
determine the second aggregation level based on determining that the quantity of bandwidth violation bits associated with the bandwidth violation trend satisfies the trend threshold.

7. The device of claim 1, where the one or more processors are further to:
determine a next available aggregation level,
the next available aggregation level being an aggregation level that is identified by an aggregation level data structure storing indicators of whether particular aggregation levels are to be used, and storing an order with which the particular aggregation levels are to be selected when determining the second aggregation level; and
where the one or more processors, when determining the second aggregation level, are further to:
determine the second aggregation level based on the next available aggregation level;
update the aggregation level data structure based on the second aggregation level; and
where the one or more processors, when setting the first aggregation level to the second aggregation level, are further to:
set the first aggregation level to the second aggregation level based on updating the aggregation level data structure.

8. A non-transitory computer-readable medium storing instructions, the instructions comprising:
one or more instructions that, when executed by one or more processors, cause the one or more processors to:
determine a first aggregation level for aggregating incoming packets,
the incoming packets being associated with a packet type;
determine a controlled packet pass rate, associated with the first aggregation level, for the incoming packets associated with the packet type;
determine that the controlled packet pass rate satisfies an arrival rate threshold;
determine a flow-dropping trend associated with the packet type and the first aggregation level,
the flow-dropping trend indicating a quantity of flow-dropping observation periods during which a flow-drop rate at which incoming packets are dropped satisfies a rate of change threshold;
determine that flow suppression is not effective based on the flow-dropping trend;
determine a second aggregation level based on determining that flow suppression is not effective,
the second aggregation level being different from the first aggregation level; and
aggregate incoming packets for flow suppression based on the second aggregation level.

9. The computer-readable medium of claim 8, where the one or more instructions, when executed by the one or more processors, further cause the one or more processors to:
determine a flow-drop bit associated with a particular flow-dropping observation period of the flow-dropping observation periods; and
where the one or more instructions, that cause the one or more processors to determine the flow-dropping trend, further cause the one or more processors to:
determine the flow-dropping trend based on the flow-drop bit.

10. The computer-readable medium of claim 8, where the one or more instructions, when executed by the one or more processors, further cause the one or more processors to:
determine a quantity of flow-drop bits associated with the flow-dropping trend,
each flow-drop, of the quantity of flow-drop bits, bit being determined based on a comparison between a respective rate of flow dropping and the rate of change threshold during a respective plurality of flow-dropping observation periods;
determine that the quantity of flow-drop bits associated with the flow-dropping trend satisfies a trend threshold; and
where the one or more instructions, that cause the one or more processors to determine that flow suppression is not effective, further cause the one or more processors to:
determine that flow suppression is not effective based on determining that the quantity of flow-drop bits associated with the flow-dropping trend satisfies the trend threshold.

11. The computer-readable medium of claim 8, where the one or more instructions, when executed by the one or more processors, further cause the one or more processors to:
determine a next available aggregation level based on an aggregation level data structure, the aggregation level data structure indicating an order with which aggregation levels are to be selected when determining the second aggregation level; and where the one or instructions, that cause the one or more processors to determine the second aggregation level, further cause the one or more processors to:

set the second aggregation level to the next available aggregation level.

12. The computer-readable medium of claim 8, where the one or more instructions, when executed by the one or more processors, further cause the one or more processors to:

identify an aggregation level data structure, the aggregation level data structure storing information identifying one or more aggregation levels at which to aggregate incoming packets associated with the packet type; and where the one or more instructions, that cause the one or more processors to determine the first aggregation level for aggregating incoming packets, further cause the one or more processors to:

determine the first aggregation level for aggregating incoming packets based on the aggregation level data structure; and where the one or more instructions, when executed by the one or more processors, further cause the one or more processors to:

update the aggregation level data structure based on determining the second aggregation level.

13. The computer-readable medium of claim 8, where the one or more instructions, that cause the one or more processors to determine the second aggregation level, further cause the one or more processors to:

determine that a most recent flow-dropping observation period, associated with updating the flow-dropping trend, has expired; and where the one or more instructions, that cause the one or more processors to determine the flow-dropping trend, further cause the one or more processors to:

determine the flow-dropping trend based on determining that the most recent flow-dropping observation period has expired.

14. The computer-readable medium of claim 8, where the one or more instructions, when executed by the one or more processors, further cause the one or more processors to:

detect one or more suspicious traffic flows, associated with one or more suspicious packets, using the first aggregation level;

suppress the one or more suspicious traffic flows; and where the one or more instructions, that cause the one or more processors to determine the flow-dropping trend, further cause the one or more processors to:

determine the flow-dropping trend based on suppressing the one or more suspicious traffic flows.

15. A method, comprising:

determining, by a device, a first aggregation level for aggregating incoming packets;

determining, by the device, a controlled packet pass rate for the incoming packets based on the first aggregation level;

determining, by the device, a bandwidth violation trend associated with the incoming packets based on the controlled packet pass rate;

determining, by the device, a flow-drop rate at which the incoming packets are dropped;

determining, by the device, a flow-dropping trend based on the flow-drop rate;

determining, by the device, that flow suppression is not effective at the first aggregation level based on the bandwidth violation trend or the flow-dropping trend;

determining, by the device, a second aggregation level based on determining that flow suppression is not effective, the second aggregation level being different from the first aggregation level; and aggregating, by the device, incoming packets for flow suppression based on the second aggregation level.

16. The method of claim 15, further comprising:

receiving a packet;

determining a packet type associated with the packet;

identifying a data structure associated with the packet type, the data structure identifying a plurality of aggregation levels; and where determining the first aggregation level for aggregating incoming packets further comprises:

determining the first aggregation level based on the data structure.

17. The method of claim 15, further comprising:

identifying a data structure, the data structure identifying a plurality of aggregation levels; and where determining the second aggregation level further comprises:

updating the data structure based on determining the second aggregation level.

18. The method of claim 15, where the first aggregation level is a sub-interface level associated with an interface level; and where determining the second aggregation level further comprises:

determining that the second aggregation level is to be a coarser aggregation level than the first aggregation level; and assigning the interface level as the second aggregation level based on determining that the second aggregation level is to be a coarser aggregation level than the first aggregation level.

19. The method of claim 15, where the first aggregation level is an interface level associated with a sub-interface level; and where determining the second aggregation level further comprises:

determining that the second aggregation level is to be a finer aggregation level than the first aggregation level; and assigning the sub-interface level as the second aggregation level based on determining that the second aggregation level is to be a finer aggregation level than the first aggregation level.

20. The method of claim 15, where the bandwidth violation trend indicates a quantity of bandwidth violation observation periods during which the controlled packet pass rate satisfied an arrival rate threshold; and where the flow-dropping trend indicates a quantity of flow-dropping observation periods during which the flow-drop rate increased; and where the determining that flow suppression is not effective at the first aggregation level based on the bandwidth violation trend or the flow-dropping trend further comprises:

determining that flow suppression is not effective based on the bandwidth violation trend indicating a threshold quantity of bandwidth violation observation periods during which the controlled packet pass rate satisfied the arrival rate threshold and the flow-dropping trend indicating a threshold quantity of flow-dropping observation periods during which the flow-drop rate did not increase.

* * * * *

UNITED STATES PATENT AND TRADEMARK OFFICE
CERTIFICATE OF CORRECTION

| | | |
|---|---|---|
| PATENT NO. | : 9,282,043 B1 | |
| APPLICATION NO. | : 14/035599 | |
| DATED | : March 8, 2016 | |
| INVENTOR(S) | : Qi-Zhong Cao | |

It is certified that error appears in the above-identified patent and that said Letters Patent is hereby corrected as shown below:

In the claims

Please correct Claim 6 as follows:

Column 19, line 44, change "second" to -- new --.
Column 19, line 45, change "second" to -- new --.

Signed and Sealed this
Twenty-fourth Day of May, 2016

Michelle K. Lee
*Director of the United States Patent and Trademark Office*